United States Patent
Kajikawa (10) Patent No.: US 8,450,638 B2
(45) Date of Patent: May 28, 2013

(54) LASER SCRIBING METHOD AND APPARATUS

(75) Inventor: Toshikazu Kajikawa, Hyogo (JP)

(73) Assignee: Seishin Trading Co., Ltd., Hyogo (JP)

( * ) Notice: Subject to any disclaimer, the term of this patent is extended or adjusted under 35 U.S.C. 154(b) by 499 days.

(21) Appl. No.: 12/657,807

(22) Filed: Jan. 28, 2010

(65) Prior Publication Data

US 2011/0180519 A1 Jul. 28, 2011

(51) Int. Cl.
*B23K 26/00* (2006.01)

(52) U.S. Cl.
USPC ............ 219/121.6; 219/121.62; 219/121.67; 219/121.68; 219/121.69; 219/121.7; 219/121.78; 219/121.79

(58) Field of Classification Search
USPC .............. 219/121.6, 121.61, 121.62, 121.67, 219/121.68, 121.69, 121.7, 121.78, 121.79, 219/121.8, 121.82, 121.85
See application file for complete search history.

(56) References Cited

U.S. PATENT DOCUMENTS

| | | | |
|---|---|---|---|
| 5,898,167 A * | 4/1999 | Musha et al. ............... 250/201.5 |
| 5,909,311 A * | 6/1999 | Ohtomo et al. .......... 359/489.07 |
| 2001/0035401 A1 * | 11/2001 | Manor ..................... 219/121.72 |
| 2006/0289410 A1 * | 12/2006 | Morita et al. ............ 219/121.67 |
| 2007/0284346 A1 * | 12/2007 | Choo ....................... 219/121.69 |

FOREIGN PATENT DOCUMENTS

| | | |
|---|---|---|
| JP | 49-126694 | 10/1974 |
| JP | 62-021207 | 1/1987 |
| JP | 62-040986 | 2/1987 |
| JP | 02-006095 | 1/1990 |
| JP | 9-108878 | 4/1997 |
| JP | 2001-121281 | 5/2001 |
| JP | 2004-087917 | 3/2004 |
| JP | 2004-198560 | 7/2004 |
| JP | 2005-014059 | 1/2005 |
| JP | 2006-000888 | 1/2006 |
| JP | 2007-000931 | 1/2007 |
| JP | 2007-129225 | 5/2007 |
| JP | 2008-137028 | 6/2008 |
| KR | 10 2006 0022982 | 3/2006 |
| WO | WO-2005/084874 | 9/2005 |
| WO | WO-2006/006850 | 1/2006 |

* cited by examiner

*Primary Examiner* — Hsien Ming Lee
(74) *Attorney, Agent, or Firm* — Jordan and Hamburg LLP (57) ABSTRACT

To form a deeper scribed groove with less energy or to improve the scribing speed, without making the apparatus configuration complicated is intended. The present invention relates to a laser scribing method which includes: forming on a workpiece a plurality of beam spots arranged in a state being separated from one another along the scribing direction, and forming a linear scribed groove on the workpiece by moving the plurality of beam spots in the scribing direction. The plurality of beam spots are obtained from a laser beam of a single ray bundle.

15 Claims, 7 Drawing Sheets

LASER SCRIBING METHOD AND APPARATUS

BACKGROUND OF THE INVENTION

1. Field of Invention

The present invention relates to a method and an apparatus for forming a linear scribed groove on a workpiece.

2. Description of the Related Art

In general methods of forming a scribed groove or hole for division on a workpiece, the position irradiated by a laser beam on the workpiece is moved while irradiating the laser beam from a laser beam source to be focused on the workpiece. In laser scribing of ceramics and the like, a Q switch laser is generally used as a laser beam source.

Scribed grooves and holes are preferably as deep as possible since cutting of the workpiece can be executed more easily and correctly. However, for increasing the depth of the grooves and holes, it is necessary to elevate the power density or the energy density of the focused laser at a position on the laser workpiece. Thus, in the case in which the laser output power is limited, deeper scribed grooves can be realized by prolonging the irradiation time of the laser beam (i.e., declining the scanning rate of the laser beam); however, to prolong the irradiation time may result in deteriorated productivity. Therefore, it is necessary to increase the output of the laser beam for quick scribing of a scribed groove having a predetermined depth, but increase of the output is not preferred since a high cost is required for the laser.

In laser scribing, a variety of other improvement efforts have been made in order to enable a workpiece to be cut more easily and correctly.

In one exemplary method, a plurality of pulsed laser beams are irradiated on a workpiece while moving the irradiation positions of the plurality of pulsed laser beams. The irradiation positions of the plurality of pulsed laser beams are moved such that a pulsed laser beam is irradiated on holes which had been formed in advance by the plurality of pulsed laser beams (for example, see pamphlet of PCT International Publication No. WO2006/006850).

According to such a method, the apparatus must be complicated, which can be disadvantageous also in cost since controlling is necessary for irradiating a laser beam on a portion where the hole had been formed in advance.

SUMMARY OF THE INVENTION

An object of the present invention is to form a deeper scribed groove with less energy or to improve the scribing speed, without making the apparatus configuration complicated.

In a first aspect of the present invention, a laser scribing method is provided which includes: forming on a workpiece a plurality of beam spots arranged in a state being separated from one another along the scribing direction, and forming a linear scribed groove on the workpiece by moving the plurality of beam spots in the scribing direction, wherein
the plurality of beam spots are obtained from a laser beam of a single ray bundle.

The plurality of beam spots are preferably obtained by splitting the laser beam of a single ray bundle into laser beams of a plurality of ray bundles, and focusing each of the laser beams of the plurality of ray bundles.

The laser beam of a single ray bundle is split by, for example, a birefringent element into the laser beams of the plurality of ray bundles. The birefringent element may be, for example, a wedged quartz crystal plate, or a multiple-image prism such as a Wollaston prism. When the birefringent element is thus used, the laser beam of a single ray bundle is split by, for example, the quartz crystal plate into an ordinary ray component and an extraordinary ray component the polarization directions of which are orthogonal to one another.

The direction of splitting of the laser beam of a single ray bundle is preferably allowed to agree with the direction of movement of the plurality of laser spots.

The direction of separating the plurality of laser spots is selected by, for example, rotating the birefringent element.

The plurality of beam spots each have a diameter of, for example, 1 µm to 200 µm.

The distance between centers of the beam spots that are adjacent to each other in the plurality of beam spots is, for example, from two times to ten times the spot diameter.

The workpiece is, for example, a hard and brittle material, and is preferably composed of ceramic, silicon or sapphire as a base material.

According to a second aspect of the present invention, a laser scribing apparatus is provided, which as an apparatus for forming a linear scribed groove on a workpiece, the apparatus including:

a laser beam source for emitting a laser beam of a single ray bundle;

a splitting means for splitting the laser beam of a single ray bundle into laser beams of a plurality of ray bundles along the scribing direction;

a light focusing means for light focusing each of the laser beams of the plurality of ray bundles; and a light scanning means for relatively moving the laser beams of the plurality of ray bundles and the workpiece.

The splitting means is, for example, a wedged birefringent element. The birefringent element may be, for example, a wedged quartz crystal plate, or a multiple-image prism such as a Wollaston prism.

The laser scribing apparatus of the present invention may further has a mechanism for rotating the splitting means around an optical axis.

The laser beam source can emit a laser beam of, for example, a linearly polarized light. In this case, it is preferred that the laser scribing apparatus of the present invention further has a ½ wavelength plate for rotating the polarization direction of the laser beam with respect to the optical axis.

The laser scribing apparatus of the present invention may further have a ¼ wavelength plate for converting each of the laser beams of the plurality of ray bundles from a linearly polarized light to a circularly polarized light. In this case, it is preferred that the laser scribing apparatus of the present invention further has a mechanism for rotating the ¼ wavelength plate around the optical axis.

The laser beam source may be one capable of emitting a circularly polarized light or a randomly polarized laser beam.

The light focusing means preferably has a focal distance determined such that beam spots in each of the laser beams of the plurality of ray bundles are formed in a state being separated from one another on the workpiece.

According to the present invention, since a laser beam is irradiated on a workpiece by forming beam spots of a plurality of ray bundles from a laser beam of a single ray bundle, a linear scribed groove can be formed efficiently by effectively utilizing the energy of the laser beam. For example, when the laser beam of a single ray bundle is split into laser beams of a plurality of ray bundles to irradiate on a workpiece, a deeper scribed groove can be formed as compared with the case in which laser a light of a single ray bundle is irradiated on a workpiece without splitting, or the setting of the scanning rate can be greater when an intended scribed groove is to be formed. Thus, the effect achieved by splitting a laser beam of a single ray bundle into laser beams of a plurality of ray bundles to irradiate on a workpiece (i.e., effect of possible formation of a deeper scribed groove, or greater setting of the scanning rate) can be also achieved even though a laser beam of a single ray bundle having an equivalent laser power is used, or an equivalent scanning rate of the laser beam (beam spot) is employed.

In addition, splitting of a laser beam of a single ray bundle into beam spots of a plurality of ray bundles can be accomplished by, for example, merely arranging birefringent elements; therefore, making the apparatus configuration complicated can be avoided. Furthermore, since irradiation of the beam spots while positioning to the hole formed in advance is not also required, movement of the beam spots can be easily controlled.

BRIEF DESCRIPTION OF THE DRAWINGS

FIG. 6 (a) to FIG. 6 (c) show a explanatory plan view illustrating a scanning state of beam spots;

FIG. 7 (a) shows a cross-sectional view illustrating irradiation of laser beams on a workpiece;

FIG. 7 (b) shows a cross-sectional view illustrating movement of the laser beams from the state shown in FIG. 7 (a);

DESCRIPTION OF THE PREFERRED EMBODIMENTS

Hereinafter, Embodiments of the present invention are explained with reference to FIG. 1 to FIG. 8.

Figure 1:
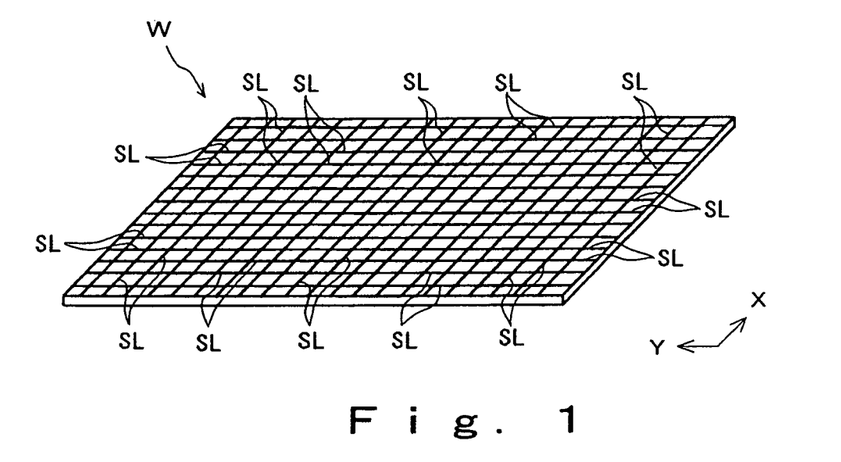
FIG. 1 shows a perspective view illustrating a workpiece on which a scribed groove is formed.

For explaining the present invention, a workpiece W on which a linear scribed groove SL is formed is first explained with reference to FIG. 1.

The workpiece W may be, for example, a wafer or an assembled substrate for electronic components such as semiconductor elements and chip resistors. The workpiece W is composed of a hard and brittle material such as, e.g., ceramic, silicon or sapphire as a primary material. In such a workpiece W, individual electronic components such as a semiconductor element and a chip resistor are configured with areas defined by linear scribed groove(s) SL. By cutting the workpiece W along the scribed groove SL, a large number of electronic components can be obtained. Although the timing for the formation of the scribed groove SL can be selected depending on the type of the electronic components, for example, the scribed groove SL may be formed before or after producing the electronic element, or after producing a part of the electronic element.

Figure 2:
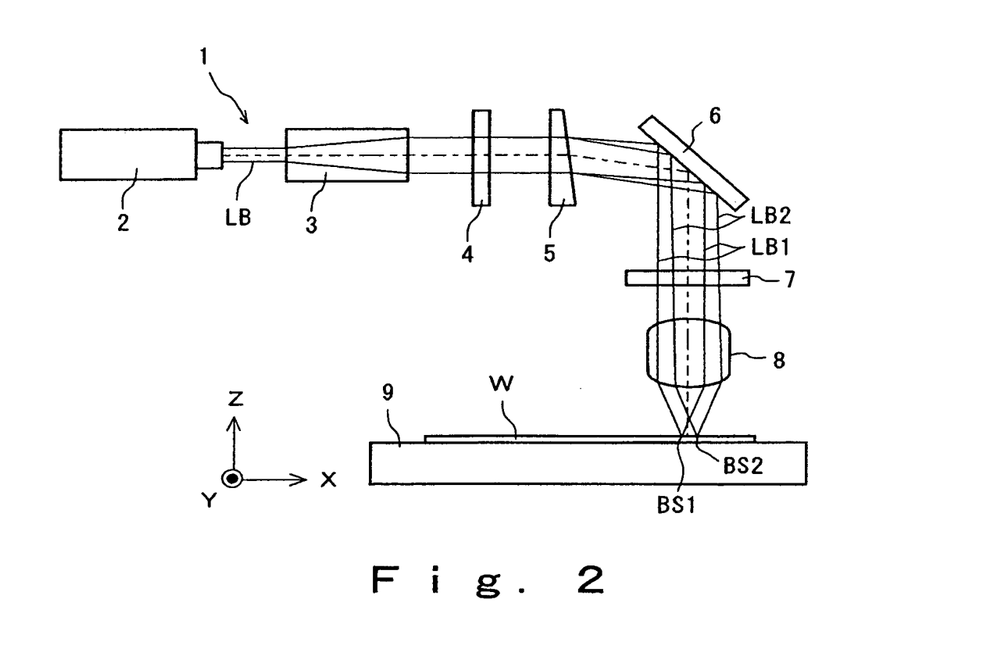
FIG. 2 shows a schematic configuration view illustrating one example of the laser scribing apparatus according to the present invention.

The scribing apparatus 1 shown in FIG. 2 includes a laser beam source 2, a beam expander 3, a ½ wavelength plate 4, a birefringent element 5, reflection plate 6, a ¼ wavelength plate 7, a light focusing lens 8 and a stage 9.

The laser beam source 2, in general, emits a laser beam LB having a great absorption wavelength on the workpiece W. In this Embodiment, the laser beam source 2 is spatially fixed. As the laser beam source 2, one that emits a laser having an oscillation wavelength to be transparent to the workpiece W can be used for carrying out processing utilizing multiphoton absorption. The laser beam LB which may be used is generally a linearly polarized light, but either a circularly polarized light or a randomly polarized light is also acceptable. The wavelength of the laser beam LB may be selected from among infrared, visible, ultraviolet regions to conform to the optical characteristics of the workpiece W and the needed width of the scribed groove. As such a laser beam source 2, one which can emit a solid laser such as a YAG laser (for example, Nd:YAG laser) or a fiber laser, or a higher harmonics thereof may be used.

When the oscillation spectrum width of the laser beam LB is too great, separation to clear spots by the birefringent element 5 fails. Therefore, the laser preferably has a narrow spectrum width.

The beam expander 3 is for enlarging the beam diameter of the laser beam of a single ray bundle LB emitted from the laser beam source 2. The laser beam LB emitted from the laser beam source 2 is expanded generally two to ten times by the beam expander 3 such that the diameter conforms to the entrance pupil diameter of the light focusing lens used. The beam expander 3 is unnecessary when the outgoing beam diameter of the laser beam LB is sufficiently great with respect to the entrance pupil diameter of the light focusing lens.

The ½ wavelength plate 4 is provided for changing the angle formed by the polarization direction and the crystallographic axis of the birefringent element 5, when the laser beam LB is a linearly polarized light, by rotating the polarization direction around the optical axis. The angle formed by the polarization direction of the laser beam LB and the crystallographic axis of the birefringent element 5 is generally set to be 45 degrees, whereby the intensity ratio of the split laser beams LB1 and LB2 will be 1:1. In addition, when a wedged quartz crystal plate is used as in an example illustrated in the figure with reference to the birefringent element 5, the intensity ratio of LB1 and LB2 can be regulated by adjusting the angle formed by the polarization direction of the laser beam LB, and the crystallographic axis and wedge angle direction of the birefringent element 5. Since such regulation is impossible when the laser beam LB is a circularly polarized light or a randomly polarized light, the ½ wavelength plate is not necessary.

The birefringent element 5 is provided for splitting the entered laser beam of a single ray bundle LB into laser beams of a plurality of ray bundles LB1 and LB2 having different travelling directions. This birefringent element splits the laser beam LB into an ordinary ray component and an extraordinary ray component with respect to the optical electric-field vector. The intensity ratio of the ordinary ray component and the extraordinary ray component is determined according to the angle formed by the polarization direction (direction of the optical electric-field vector) of the entered laser beam and the crystallographic axis of the birefringent element 5. Moreover, since the birefringent element 5 has a wedge angle, it can function as a prism due to the difference between the refractive index for the ordinary ray and the refractive index for the extraordinary ray. The laser beam LB thus transmitted the birefringent element 5 is split into an ordinary ray and an extraordinary ray the polarization directions of which are orthogonal to one another, and thus split into two laser beams LB1 and LB2 that travel with different outgoing angles with respect to the wedge angle direction. Although a mechanism of rotating the birefringent element 5 around the optical axis for the purpose of allowing the directions of the split laser beams LB1 and LB2 to meet the scribing direction, this mechanism is not show in FIG. 3.

Additionally, the wedge angle of such a birefringent element 5 leads to a difference between the travelling direction of the laser beam transmitted the birefringent element 5, and the incident laser beam axis; therefore, a wedge prism for correcting the same may be inserted into the optical path.

Figures 3, 4:
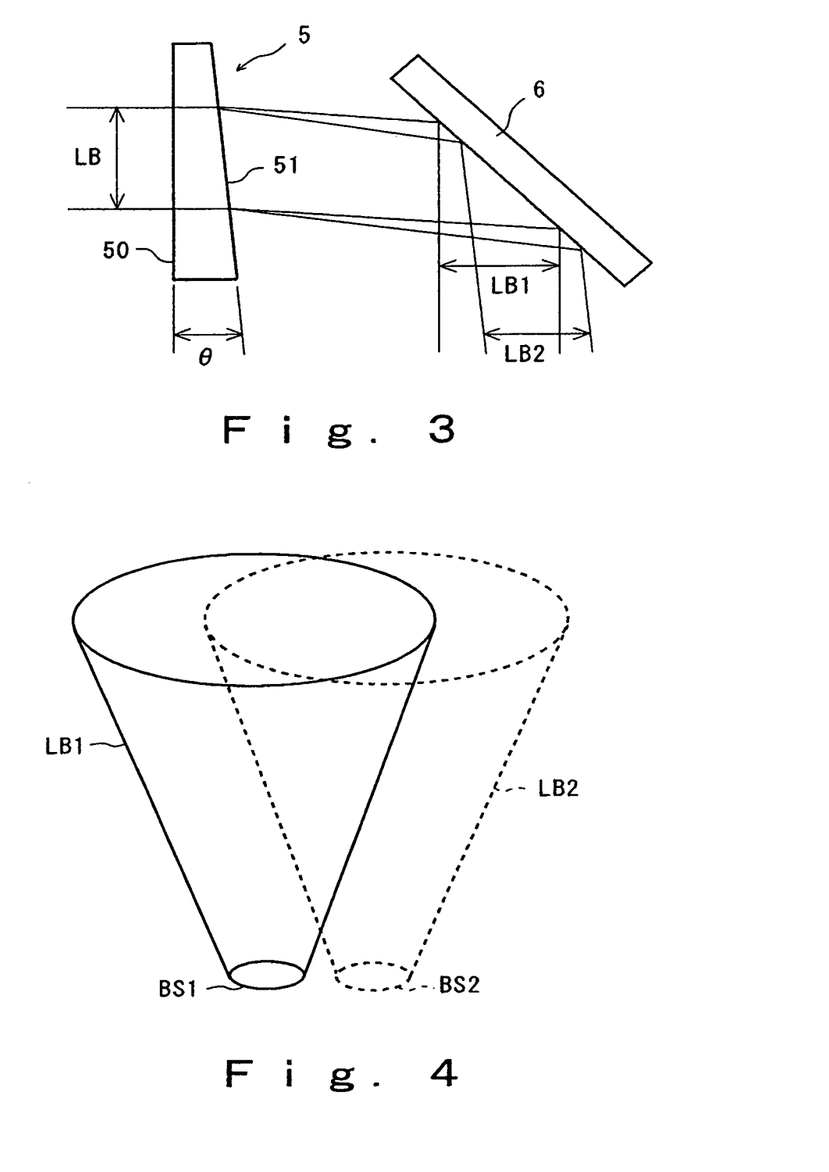
FIG. 3 shows a schematic view illustrating an enlarged main section of the laser scribing apparatus shown in FIG. 2.
FIG. 4 shows a perspective view illustrating of a state of a laser beam emitted from a light focusing lens.

When a wedged quartz crystal plate is used as the birefringent element 5 as in the case of the example which in the Figure, the center-to-center spacing (distance between centers) IN of the beam spots BS1 and BS2 formed on the workpiece W can be defined on such a quartz crystal plate, depending on the wedge angle (crossed faces angle formed by a light entrance face 50 and a light exit face 51 on the quartz crystal plate) θ, the wavelength of the laser beam LB and the focal distance of the light focusing lens 8. When, for example, the wavelength of the laser beam LB is 1.064 μm, and the light focusing lens 8 has a focal distance of 100 mm, the wedge angle θ is set to be about 2 degrees for making the center-to-center spacing IN be 60 μm.

As the birefringent element 5 which may be used, a multiple-image prism is also exemplified in addition to the wedged quartz crystal plate shown in the Figure. The multiple-image prism refers to a prism designed such that the ordinary ray and the extraordinary ray obtained by splitting are sent out in distinct directions without blocking either of them. Such a multiple-image prism include, for example, a Wollaston prism.

The reflection plate 6 shown in FIG. 2 is provided for directing the laser beams of the plurality of ray bundles LB1 and LB2 emitted from the birefringent element 5 to the light focusing lens 8 by changing the optical path. As the reflection plate 6, well-known reflection plate may be used such as a total reflection mirror.

The ¼ wavelength plate 7 is provided for converting each of the laser beams of the plurality of ray bundles LB1 and LB2 from a linearly polarized light to a circularly polarized light. It should be noted that the ¼ wavelength plate 7 is arranged as needed between the birefringent element 5 and the light focusing lens 8. By inserting into the optical path such that the crystallographic axis of the ¼ wavelength plate 7 forms an angle of 45 degrees with respect to the polarization directions of the laser beams LB1 and LB2, each of the laser beams LB1 and LB2 can be converted into a circularly polarized light. In general, since the angle formed by the polarization direction and the scribing direction results in alteration of the scribing characteristics, scribe processing hardly affected by polarization can be realized by converting the linearly polarized light into a circularly polarized light. Although not shown in FIG. 3, when continuous change of the splitting directions (polarization directions) of the laser beams LB1 and LB2 is required such as the case in which curved scribing is carried out, a mechanism of rotating the ¼ wavelength plate 7 is necessary to meet therewith.

Figure 5:
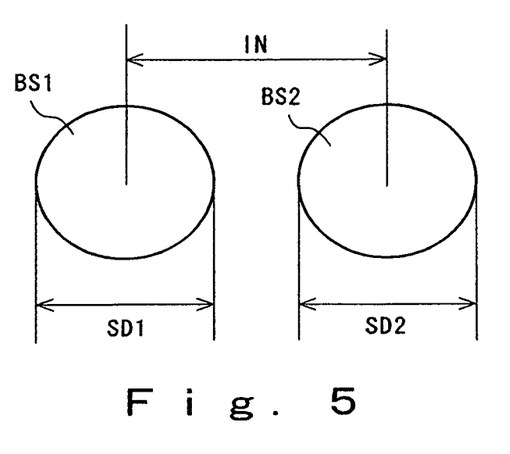
FIG. 5 shows a plan view illustrating a state of beam spots irradiated on a workpiece.

The light focusing lens 8 shown in FIG. 2 is provided, for example, for light focusing each of the laser beams of the plurality of ray bundles LB1 and LB2, and forming a plurality of beam spots BS1 and BS2 on the workpiece W as shown in FIG. 4 and FIG. 5. The type of the light focusing lens 8 may be any one as long as the laser beams LB1 and LB2 can be focused to give intended spot diameters SD1 and SD2. The respective diameters SD1 and SD2 of the beam spots BS1 and BS2 formed on the workpiece W may be, for example, 1 μm to 200 μm. When such beam spots BS1 and BS2 having the spot diameters SD1 and SD2, respectively are formed on the workpiece W, the light focusing lens 8 having a focal distance of, for example, 2 mm to 500 mm may be employed. It should be noted that the spot diameters SD1 and SD2 are correlated with beam diameters of the laser beams LB1 and LB2 entered into the light focusing lens 8, and wavelengths thereof.

The stage 9 is provided for supporting the workpiece W, and designed so as to be, for example, movable in three directions of X direction, Y direction and Z direction. In this Embodiment, since the laser beam source 2 (laser beams LB1 and LB2) is spatially fixed, movement of the stage 9 enables the workpiece W to be relatively moved, and as a result, the laser beams LB1 and LB2 can be moved. To this end, a means such as a galvanometer scanner can be used which spatially fixes a workpiece W, and allows the laser beams LB1 and LB2 to be relatively moved. By regulating the direction of the movement of the stage 9, movement trajectories of the beam spots BS1 and BS2 can be regulated. In addition, by regulating the movement speed of the stage 9, movement speed of the beam spots BS1 and BS2 (i.e., scribing speed) SP can be adjusted.

In FIG. 2, since it is necessary to separate the beam spots BS1 and BS2 in directions parallel to the scribing direction, the birefringent element 5 should be rotated around the optical axis in accordance with the movement direction of the stage 9. More specifically, when scribed in the X direction, it is necessary to separate the beam spots BS1 and BS2 in the X direction; therefore, the adjustment is carried out by rotating the birefringent element 5 such that the wedge angle direction of the birefringent element 5 is included in the X-Z plane. On the other hand, since it is necessary to separate the beam spots BS1 and BS2 in the Y direction when scribed in the Y direction, the birefringent element 5 is further rotated by 90 degrees around the optical axis to adjust such that the wedge angle direction of the birefringent element 5 is included in the X-Y plane. By thus adjusting the rotation direction of the wedge angle, selection of the scribing method that is more suited for the processed object is enabled.

Next, method of forming a scribed groove SL using the scribing apparatus 1 is explained.

When a scribed groove SL is formed using a scribing apparatus 1, beam spots BM1 and BM2 are relatively moved in the scribing direction (X direction or Y direction) with respect to the workpiece W, while a laser beam LB is emitted from the laser beam source 2.

The laser beam LB emitted from the laser beam source 2 is a linearly polarized light, which may have a wavelength of a fundamental wave, SHG (second harmonic generation), THG (third harmonic generation), or FHG (fourth harmonic generation). Such a laser beam LB is emitted as a CW (continuous oscillation) light or a pulse having a frequency of 100 Hz to 1 GHz such that the average output on the surface of the workpiece W becomes, for example, 0.1 W to 200 W. In the case of a Q switch laser, a laser having a value of the pulse width that is suited for the material characteristics of the workpiece W.

Relative moving of the beam spots BS1 and BS2 with respect to the workpiece W may be carried out by a method of moving the workpiece W, a method of moving the light focusing lens 8, or a method of using a means such as a galvanometer scanner. Such relative moving of BS1 and BS2 may be generally achieved by moving the stage 9. The relative movement speed (scribing speed) SP of the beam spots BS1 and BS2 with respect to the workpiece W is set to be, for example, 1 mm/sec to 1,000 mm/sec.

The laser beam of a single ray bundle LB emitted from the laser beam source 2 is expanded by the beam expander 3 so as to have a beam diameter suited for the light focusing lens, and thereafter transmits the ½ wavelength plate 4.

The polarization direction of the laser beam of a single ray bundle LB after transmitting the ½ wavelength plate 4 rotates by a predetermined angle in the case of a linearly polarized light, and transmits the birefringent element 5. The laser beam LB is split into laser beams of a plurality of ray bundles LB1 and LB2 having different travelling directions when transmits the birefringent element 5. When a wedged quartz crystal plate is used as the birefringent element 5, the split angle of the laser beams of the plurality of ray bundles LB1 and LB2 can be defined by the wedge angle and the laser wavelength. In addition, by regulating the split angle of the laser beams of the plurality of ray bundles LB1 and LB2, and the focal distance of the light focusing lens 8, center-to-center spacing IN of the beam spots BS1 and BS2 formed on the workpiece W can be defined.

The laser beams of the plurality of ray bundles LB1 and LB2 transmitted the birefringent element 5 transmit the ¼ wavelength plate 7 after the optical path was changed by the reflection plate 6. The laser beams of the plurality of ray bundles LB1 and LB2 transmitted the ¼ wavelength plate 7 is entered into the light focusing lens 8 after conversion from the linearly polarized light into a circularly polarized light. The ¼ wavelength plate 7 alters characteristics of the laser processing upon irradiation of the linearly polarized light onto the workpiece W, and may be omitted.

The laser beams of the plurality of ray bundles LB1 and LB2 that entered the light focusing lens 8 are focused respectively, and form beam spots BS1 and BS2 on the workpiece W. The spot diameters SD1 and SD2 of the beam spots BS1 and BS2 are determined by the beam diameter of the laser beams LB1 and LB2 that enter the light focusing lens 8, and the focal distance of the light focusing lens 8. The spot diameters SD1 and SD2 on the workpiece W surface can be adjusted depending on the focal point or beam waist position, i.e., whether it is formed on the surface of the workpiece W, or formed inside the workpiece W.

Figure 6:
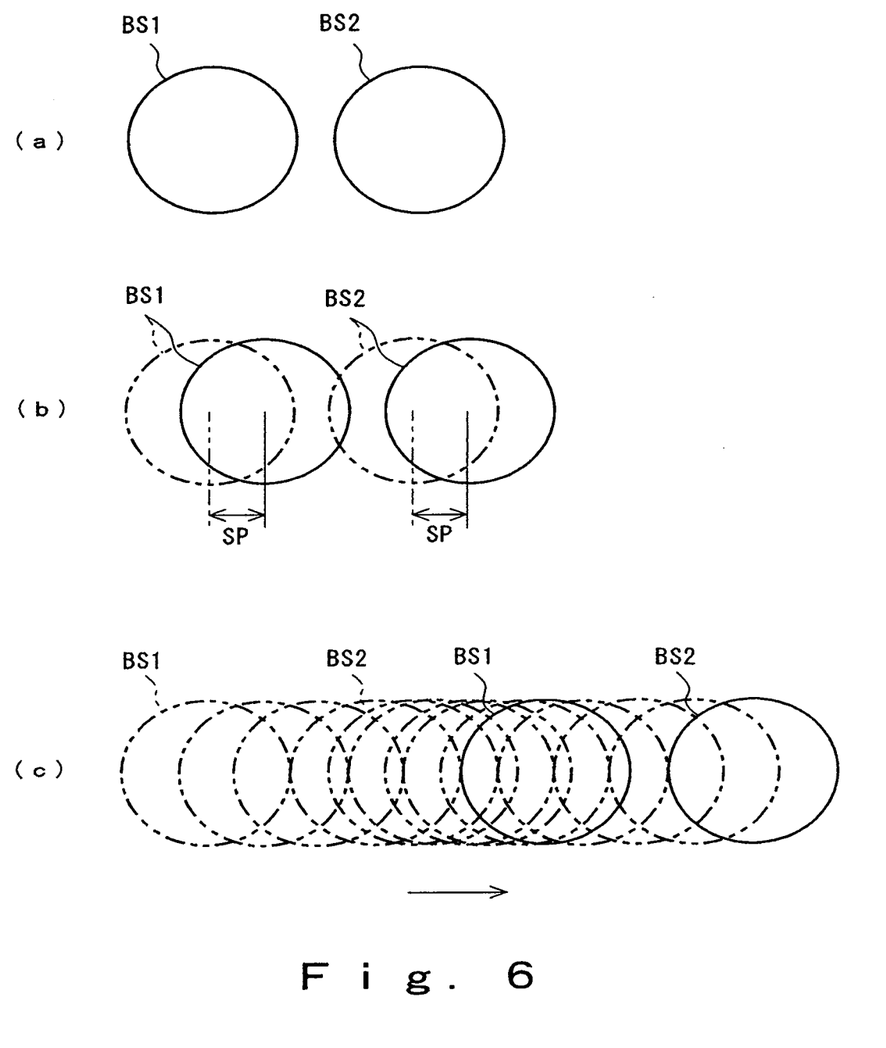
Figure 7:
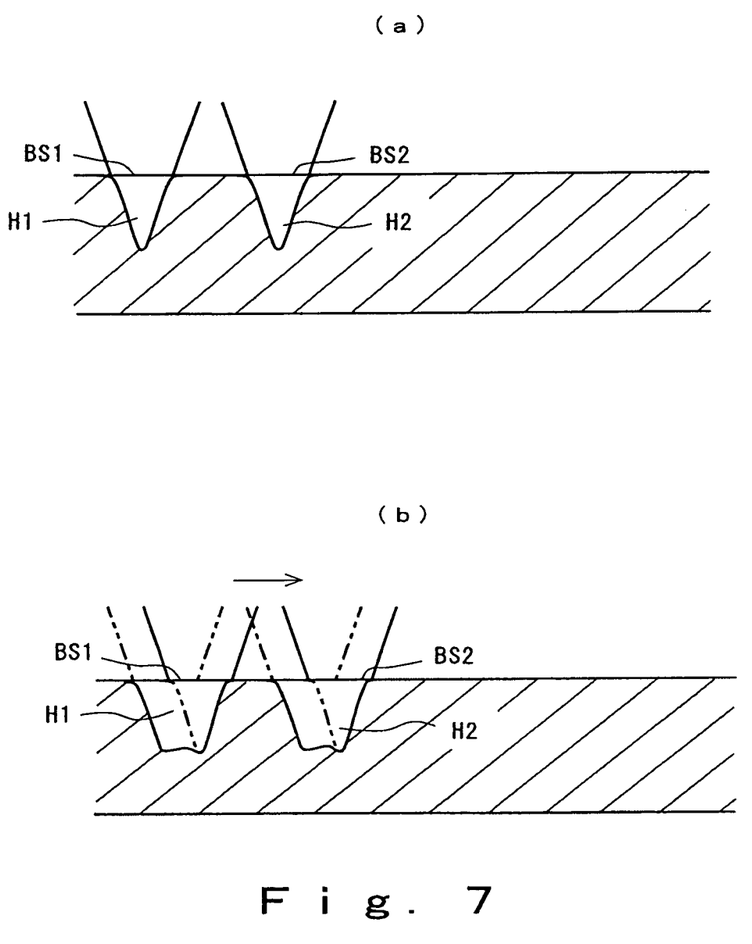

FIG. 6 (a) and FIG. 7 (a) show states of the workpiece W when 1 shot of the laser beam LB was emitted. Since two laser beams LB1 and LB2 are irradiated at once on the workpiece W, two holes H1 and H2 are formed simultaneously.

Figure 8:
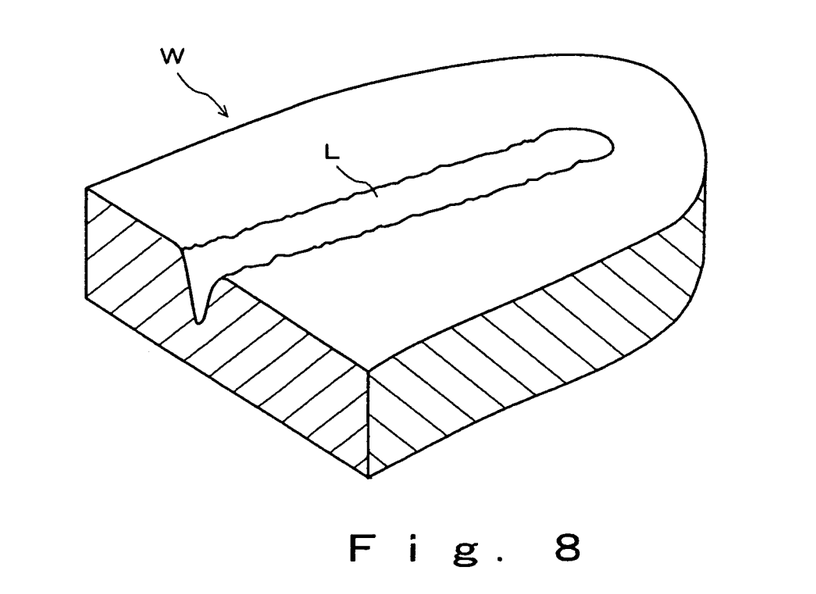
FIG. 8 shows a perspective view illustrating a main section of the workpiece after the laser beams were moved and irradiated on the workpiece.

As shown in FIG. 6 (b) and FIG. 7 (b), when the second shot of the laser beam LB is emitted from the laser beam source 2 while moving the workpiece W at a predetermined scribing speed SP (for example, 1 mm/sec to 1000 mm/sec), new holes H1 and H2 are formed so as to be contiguous to the holes H1 and H2 formed in advance, with the laser beams LB1 and LB2, respectively. By moving the beam spots BS1 and BS2 while carrying out such pulse oscillation of the laser beam LB repeatedly, the trajectory of the beam spots BS1 and BS2 shown in FIG. 6 (c) is aligned along the scribing direction. As a result, a groove L is formed on the workpiece W along the scribing direction, as shown in FIG. 8. Specifically, the stage 9 is moved in the X direction or the Y direction such that the beam spots BS1 and BS2 trace the intended trajectory, and the birefringent element 5 and/or the ¼ wavelength plate 7 is rotated in switching the scribing direction between the X direction and the Y direction, whereby the intended scribed groove SL can be formed on the workpiece W as shown in FIG. 1.

Accordingly, it is unnecessary to carry out positioning of the beam spots BS1 and BS2 to the holes formed in advance upon irradiation of the laser beams LB1 and LB2 in the scribing apparatus 1. In other words, movement of the beam spots BS1 and BS2 can be easily controlled without needs of complicated control according to this scribing apparatus 1. In addition, for example, since just arranging the wedged quartz crystal plate as the birefringent element 5 is satisfactory for splitting the laser beam of a single ray bundle LB into beam spots LB1 and LB2 of a plurality of ray bundle, the configuration of the laser scribing apparatus 1 is made much less complicated even in the case in which a configuration of splitting the laser beam LB is employed.

In the scribing apparatus 1, a plurality of beam spots BS1 and BS2 formed from a laser beam of a single ray bundle LB are irradiated on a workpiece W, whereby a scribed groove SL is formed on the workpiece W. According to such a procedure, a linear scribed groove SL can be efficiently formed by effectively utilizing the energy of the laser beam LB, as is also proven from the results of Examples described later, since beam spots BS1 and BS2 of a plurality of ray bundles are formed from a laser beam of a single ray bundle LB, and the laser beams LB1 and LB2 are irradiate on the workpiece W. For example, when a laser beam of a single ray bundle LB is split into laser beams of a plurality of ray bundles LB1 and LB2 and irradiated on a workpiece W, a deeper scribed groove SL can be formed, or a scribing speed SP can be set greater for forming an intended scribed groove SL, in comparison with the case in which a laser beam of a single ray bundle LB is irradiated on a workpiece W without splitting. Accordingly, when the laser beam of a single ray bundle LB is split into laser beams of a plurality of ray bundles LB1 and LB2 and irradiated on a workpiece W, a deeper scribed groove SL can be formed as compared with the case in which a laser beam of a single ray bundle LB having the same laser power is used without splitting, and further, setting of the scanning rate SP can be of a greater value.

Grounds for achieving such effects are believed to account for predominantly the following reasons, as the energy of the laser beam LB can be effectively utilized to enable a scribed groove SL to be efficiently formed although other factors may be also assumed.

The first reason results from absorption of the energy (photon) due to the plasma. More specifically, when a pulse laser beam is irradiated as laser beams LB1 and LB2 on a workpiece W, the material of the workpiece W is molten and vaporized to produce a plasma in the initial stage of each pulse irradiation, and the trailing pulse laser beam is absorbed by the plasma. Therefore, this plasma leads to decrease in the light intensity of the laser that reaches the bottom of the scribed groove, and consequently, results in difficulty in forming a deep scribed groove.

On the other hand, when a plurality of beam spots BS1 and BS2 are formed in the scribing direction separately, the beam spot BS1 will follow the beam spot BS2 that precedes in the scribing direction in forming the scribed groove SL. Therefore, it becomes possible to irradiate the beam spot BS1 in the vicinity of the previous irradiation position of the laser beam LB2 (beam spot BS2) after the plasma produced by the beam spot BS2 is extinguished. In other words, irradiation of the laser beam LB1 in the vicinity of a region in which the plasma has been already reduced is enabled at a time point of irradiation of the laser beam LB1. As a result, it is believed that the depth of the scribed groove SL can be increased since the absorption by the plasma (energy loss) is avoided, and the irradiation energy can be effectively utilized.

The second reason results from multiple reflection and absorption of the laser beam LB1 in the scribed groove. As described above, when absorption of the laser beam by the plasma generated in the processed region is attenuated, progress of the trailing laser beam to the bottom of the scribing-processed groove formed in the initial stage is enabled. The trailing laser beam that progressed the scribed groove advances to the bottom of the groove while repeating the reflection on the lateral face of the groove, and is absorbed to the workpiece W during this process. As compared with the case in which the laser beam LB1 is irradiated on a planer face of the workpiece, benefits from multiple reflection and absorption on the lateral face of the groove can be more likely to be received, and laser beam LB1 energy can be more effectively utilized when the laser beam LB1 is irradiated at a position where a hole H2 had been formed in advance. As a result, it is believed that the depth of the scribed groove SL can be increased since irradiation energy can be effectively utilized at the irradiation position of the laser beam LB1 (beam spot BS1). Furthermore, by irradiation of the laser beam LB2, the temperature of the irradiated site of the workpiece W is kept high when the trailing LB1 is irradiated. In general, since reflectance of the material is lowered at a high temperature, the absorption of the laser beam LB1 will be more efficiently executed.

EXAMPLES

Example

A laser beam emitted from a laser beam source was split, and a scribed groove was formed on a workpiece using a laser scribing apparatus which can form a plurality of beam spots. Thus, a relationship between the defocus position and the depth of the groove was investigated.

As the laser scribing apparatus, the laser scribing apparatus as shown in FIG. 2 was used having a configuration from which the ¼ wavelength plate was omitted.

As the laser beam source, Nd: YAG laser (wavelength: 1064 nm, output: 10 W) was used. The output characteristics of the laser beam were determined as shown in Table 1.

As the birefringent element, a quartz crystal plate having a wedge angle of 2° was used.

A lens having a focal distance f of 50 mm was used as the light focusing lens.

As the workpiece, an alumina ceramic having a thickness of 0.28 mm was used.

The scribing speed (movement speed of the beam spot) SP was set to be 50 mm/sec.

The depth of the scribed groove was measured at the focal point, and each point away from this focal point (10 μm pitch) by varying shift lengths (defocal distance). The measurement of the depth at the same defocal distance was carried out fundamentally at three sites. The scribe depth was measured by observing the cross section of the scribed groove using a measuring microscope equipped with a stage having a scale (manufactured by Nikon), and reading the graduation of the scale.

Figure 9:
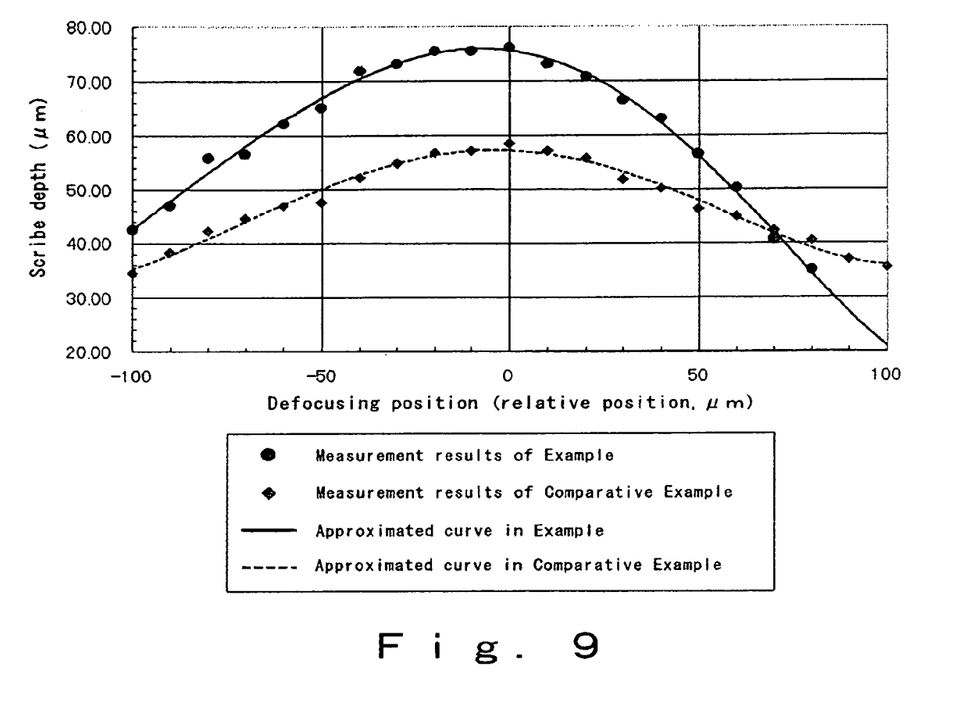
FIG. 9 shows a graph demonstrating a relationship between measurement results on the scribe depth, and defocus positions in Example.

The mean value of the measurement results of the depths with the same defocal distance is shown in FIG. 9, in terms of a relationship of the defocal distance (relative position) and the scribe depth. In the graph shown in FIG. 9, measurement results (plot points) obtained using the laser scribing apparatus of Example, and an approximated curve thereof are indicated by a solid line.

Comparative Example

On the other hand, in Comparative Example, measurements were carried out according to a conventional process in which the scribed groove was formed with a single beam spot by the laser beam emitted from the laser beam source without splitting. As shown in Table 1, a scribed groove was formed on a workpiece in Comparative Example using a similar scribing apparatus to the laser scribing apparatus used in Example except that the birefringent element and the ½ wavelength plate were not included. The mean value of the measurements with the same defocal distance, and an approximated curve thereof are indicated by a dotted line in FIG. 9.

TABLE 1

| | Laser wavelength | Laser power | Pulse frequency | Birefringent Element | 1/2 Wavelength plate | Scribing speed |
| --- | --- | --- | --- | --- | --- | --- |
| Example | 1064 nm | 8.0 W | 45 kHz | Wedge angle = 2° | Present | 50 mm/sec |
| Comparative Example | 1064 nm | 8.0 W | 45 kHz | Absent | Absent | 50 mm/sec |

The Laser Power being Represented by a Value on the Processed Face

It is clear from FIG. 9 that comparison of the case in which the scribed groove was formed with the laser scribing apparatus of Example with the case in which the scribed groove was formed with the laser scribing apparatus of Comparative Example reveals that the scribed groove of Example had a greater depth in terms of both the focal point and the defocus position.

Therefore, it was ascertained that when a laser beam of a single ray bundle was split using a laser scribing apparatus of Example, and a plurality of beam spots were irradiated on the workpiece to form a scribed groove, a deeper scribed groove can be formed as compared with the case in which a scribed groove was formed on a workpiece by forming a single beam spot with a laser beam of a single ray bundle having the same laser power, even though the same scanning rate (scribing speed) of the beam spot was employed.

What is claimed is:
1. A laser scribing method comprising:
forming on a workpiece a plurality of beam spots arranged in a state being separated from one another along the scribing direction, and forming a linear scribed groove on the workpiece by moving the plurality of beam spots in the scribing direction, wherein
the plurality of beam spots are obtained by splitting a laser beam of a single ray bundle into laser beams of a plurality of ray bundles by a birefringent element and focusing each of the laser beams of the plurality of ray bundles,
the beam spots are moved in the scribing direction while carrying out pulse oscillation of the laser beam to form new holes so as to be contiguous to the holes formed in advance,
the beam spots each have a diameter of 1 μm to 200 μm, and the distance between centers of the beam spots that are adjacent to each other in the plurality of beam spots is from two times to ten times the spot diameter.

2. The laser scribing method according to claim 1, wherein the birefringent element is a wedged quartz crystal plate.

3. The laser scribing method according to claim 1, wherein the birefringent element is a multiple-image prism.

4. The laser scribing method according to claim 1, wherein the laser beam of a single ray bundle split by the birefringent element into an ordinary ray component and an extraordinary ray component the polarization directions of which are orthogonal to one another.

5. The laser scribing method according to claim 1, wherein the direction of splitting of the laser beam of a single ray bundle is allowed to agree with the direction of movement of the plurality of beam spots.

6. The laser scribing method according to claim 5, wherein the direction of separating the plurality of beam spots is selected by rotating the birefringent element.

7. A laser scribing apparatus for forming a linear scribed groove on a workpiece, the apparatus comprising:
    a laser beam source for emitting a laser beam of a single ray bundle;
    a birefringent element for splitting the laser beam of a single ray bundle into laser beams of a plurality of ray bundles along the scribing direction;
    a light focusing means for forming a plurality of beam spots by light focusing each of the laser beams of the plurality of ray bundles; and
    a light scanning means for relatively moving the laser beams of the plurality of ray bundles and the workpiece, wherein
    the beam spots each have a diameter of 1 μm to 200 μm and the distance between centers of the beam spots that are adjacent to each other in the plurality of beam spots is from two times to ten times the spot diameter, by way of the birefringent element and the light focusing means, and
    the laser beams and the workpiece are relatively moved while carrying out pulse oscillation of the laser beam to form new holes so as to be contiguous to the holes formed in advance, by way the laser beam source and the light focusing means.

8. The laser scribing apparatus according to claim 7, wherein the birefringent element is a wedged quartz crystal plate.

9. The laser scribing apparatus according to claim 7, wherein the birefringent element is a multiple-image prism.

10. The laser scribing apparatus according to claim 7, further comprising a mechanism for rotating the birefringent element around an optical axis.

11. The laser scribing apparatus according to claim 7, wherein
    the laser beam source can emit a laser beam of a linearly polarized light; and
    the laser scribing apparatus further comprises a ½ wavelength plate for rotating the polarization direction of the laser beam with respect to an optical axis.

12. The laser scribing apparatus according to claim 11 further comprising a ¼ wavelength plate for converting each of the laser beams of the plurality of ray bundles from a linearly polarized light to a circularly polarized light.

13. The laser scribing apparatus according to claim 12 further comprising a mechanism for rotating the ¼ wavelength plate around the optical axis.

14. The laser scribing apparatus according to claim 7, wherein the laser beam source is capable of emitting a circularly polarized light or a randomly polarized laser beam.

15. The laser scribing apparatus according to claim 7, wherein the light focusing means has a focal distance determined such that beam spots in each of the laser beams of the plurality of ray bundles are formed in a state being separated from one another on the workpiece.

* * * * *